Nov. 28, 1944. A. C. RUDEN 2,363,553
METHOD OF AND APPARATUS FOR DIE ROLLING
Filed July 11, 1940 12 Sheets-Sheet 1

INVENTOR.
ARTHUR C. RUDEN
BY
ATTORNEYS.

Fig.2

Nov. 28, 1944.  A. C. RUDEN  2,363,553
METHOD OF AND APPARATUS FOR DIE ROLLING
Filed July 11, 1940  12 Sheets-Sheet 3

Fig. 3

INVENTOR.
ARTHUR C. RUDEN
BY
ATTORNEYS.

Nov. 28, 1944.  A. C. RUDEN  2,363,553
METHOD OF AND APPARATUS FOR DIE ROLLING
Filed July 11, 1940   12 Sheets-Sheet 5

INVENTOR.
ARTHUR C. RUDEN
BY
ATTORNEYS.

Nov. 28, 1944. A. C. RUDEN 2,363,553
METHOD OF AND APPARATUS FOR DIE ROLLING
Filed July 11, 1940 12 Sheets-Sheet 6

INVENTOR.
ARTHUR C. RUDEN
BY
ATTORNEYS.

Nov. 28, 1944.  A. C. RUDEN  2,363,553
METHOD OF AND APPARATUS FOR DIE ROLLING
Filed July 11, 1940   12 Sheets-Sheet 8

INVENTOR.
ARTHUR C. RUDEN
BY
ATTORNEYS.

Nov. 28, 1944.                A. C. RUDEN                2,363,553
              METHOD OF AND APPARATUS FOR DIE ROLLING
                  Filed July 11, 1940        12 Sheets-Sheet 9

INVENTOR.
ARTHUR C. RUDEN
BY
ATTORNEYS.

Nov. 28, 1944.  A. C. RUDEN  2,363,553
METHOD OF AND APPARATUS FOR DIE ROLLING
Filed July 11, 1940    12 Sheets-Sheet 10

INVENTOR.
ARTHUR C. RUDEN
BY
ATTORNEYS.

INVENTOR.
ARTHUR C. RUDEN
BY
ATTORNEYS.

Nov. 28, 1944. A. C. RUDEN 2,363,553
METHOD OF AND APPARATUS FOR DIE ROLLING
Filed July 11, 1940 12 Sheets-Sheet 12

INVENTOR.
ARTHUR C. RUDEN
BY
ATTORNEYS.

Patented Nov. 28, 1944

2,363,553

UNITED STATES PATENT OFFICE 2,363,553

METHOD OF AND APPARATUS FOR DIE ROLLING

Arthur C. Ruden, Euclid, Ohio, assignor to The Mid-West Forge Company, Cleveland, Ohio, a corporation of Ohio Application July 11, 1940, Serial No. 345,587

14 Claims. (Cl. 80—26)

This invention relates, as indicated, to a method of and apparatus for die rolling, but has reference more particularly to the die rolling of blanks by means of successive sets of die rolls.

In my prior Patent No. 2,187,753, there is disclosed apparatus for die rolling blanks, comprising spaced sets of rolls arranged so that the blank must pass completely out of one set of rolls before entering the next set of rolls, and means for positively feeding the blank into each set of rolls in exact registration with the die portions of said set of rolls.

The present invention is directed to apparatus of the foregoing character, in which is incorporated certain improvements and refinements, which make for increased speed in operation of the apparatus, and improved accuracy in feeding of the blank into the various sets of rolls and among which may be enumerated the following:

1. Means are provided for positively feeding the blank into each set of rolls and insuring that the front end of the blank will enter the rolls in a predetermined registering relation with the die portions of such rolls.

2. Means are provided for temporarily delaying the movement of the blank in the event that the front end of the blank, as it is about to enter the rolls, is not in a predetermined registering relation with the die portions of such rolls, and for preventing further movement of the blank until such relationship is established.

3. Fluid-actuated means are provided for positively feeding the blank into each set of rolls, and for controlling the movements of the blank feeding mechanism.

To the accomplishment of the foregoing and related ends, the invention, then, comprises the features hereinafter fully described, and particularly pointed out in the claims, the following description and the annexed drawings setting forth in detail certain illustrative embodiments of the invention, these being indicative however, of but a view of the various ways in which the principle of the invention may be employed.

In said annexed drawings:

Fig. 3 is a front elevation of the mill, as viewed in the direction indicated by the arrow F in Fig. 1;

Referring more particularly to the drawings, the mill consists, as shown, of alternately arranged horizontal and vertical mill stands, respectively and generally designated by the reference characters H and V. The spaces between these stands gradually increase in accordance with the progressive lengthening of the blank which is being forged, the number of stands required and the exact spacing therebetween being determined by the nature of the article which is to be produced. An essential requirement in this connection is that the sets of rolls be spaced a greater distance apart than the length of the blank.

The vertical stands comprise transversely spaced housings 1 and 2 and the horizontal stands comprising superimposed housings 3 and 4, the housings 1 and 2 being maintained in spaced relation by means of spacers 5.

Figure 1:
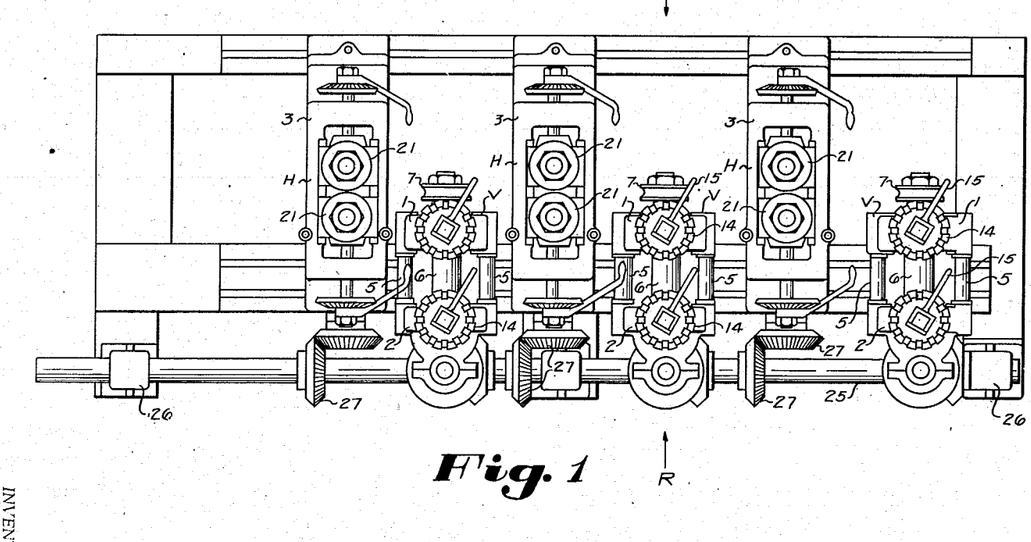
Fig. 1 is a plan view of a rolling mill embodying the novel features of the invention.
Figure 2:
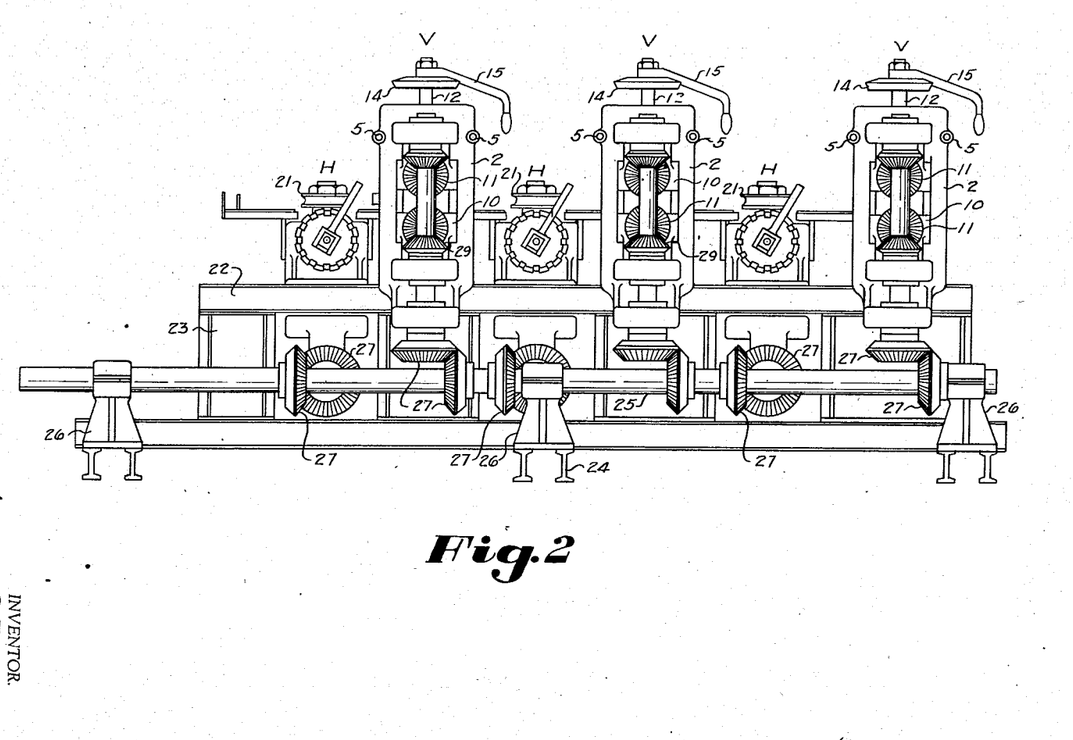
Fig. 2 is a rear elevation of the mill, as viewed in the direction indicated by the arrow R in Fig. 1.
Figure 4:
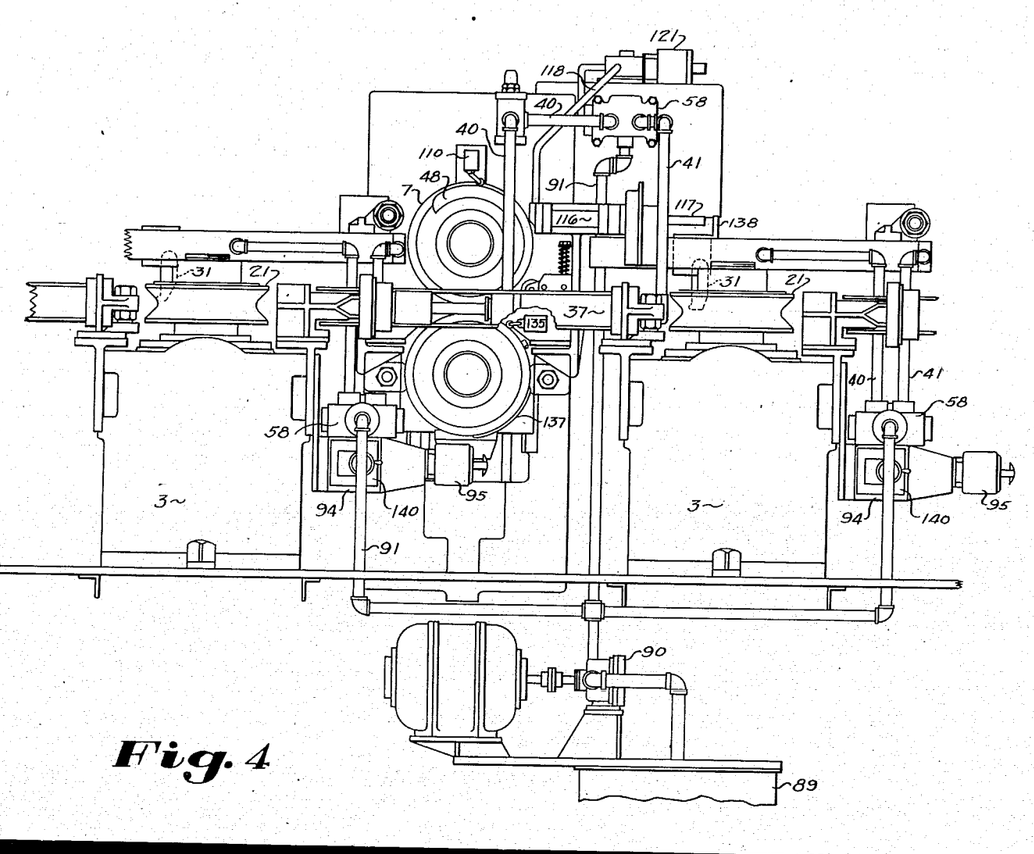
Fig. 4 is a view, on an enlarged scale, of a portion of Fig. 3.
Figure 5:
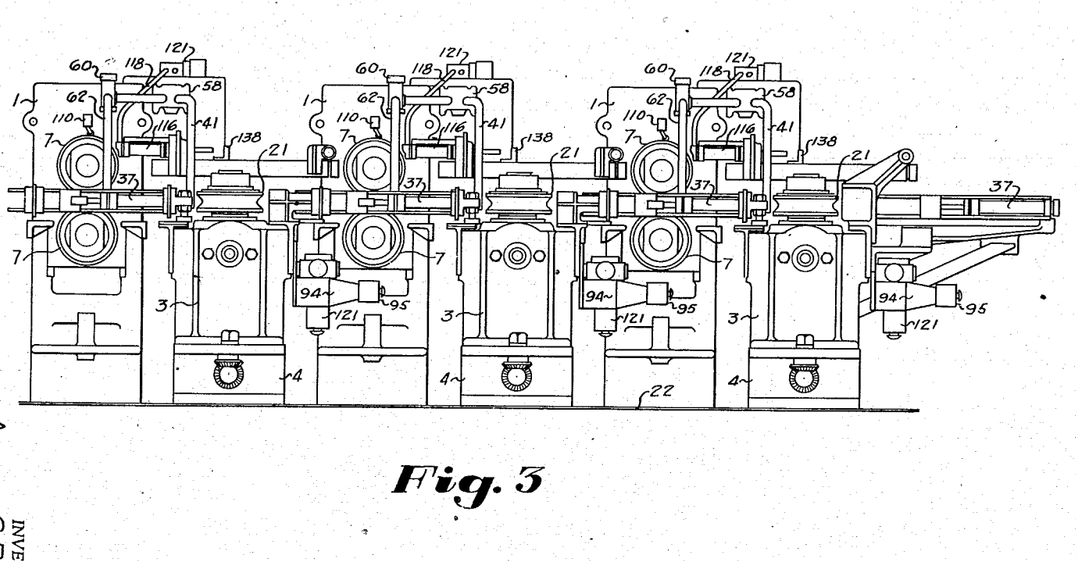
Fig. 5 is an end elevation of the rolling mill, as viewed from the right of Figs. 1 and 2, and from the left of Fig. 3.

As shown most clearly in Fig. 5, each of the vertical stands further includes vertically-spaced shafts 6, each having secured to one end a die roll 7, the rolls being maintained in position by means of nuts 8, and the shafts being journalled in chocks 9 and 10. These chocks are movable vertically along suitable guides of the housings 1 and 2.

Each of the shafts 6 has secured to its opposite end a pinion 11. The upper chocks 9 and 10 are vertically adjusted by means of adjusting screws 12 and 13, respectively in threaded engagement with the bridge portions of housings 1 and 2. The screws 12 and 13 have secured to their upper ends adjusting wheels 14 and adjusting wheel levers 15, whereby the upper shaft 6 may be vertically adjusted. Similar vertical adjustment for the lower shaft 6 is provided, in the form of adjusting screws which are rotatable by means of spur gears 16 and 17 driven by a shaft 18. Axial adjustment of the rolls 6 is effected by means of roll adjusting nuts 19.

Each of the horizontal stands further includes transversely spaced shafts 20, each having secured to its upper end a die roll 21. The construction of these stands, and the manner in which the shafts 20 are adjusted are similar to those described in applicant's aforesaid patent, and further description thereof is accordingly believed unnecessary.

The mill stands are mounted on rails 22 and may be adjusted along these rails to vary the spacing between the sets of die rolls. The rails 22 are, in turn, mounted on rail supports 23, and these, in turn, are supported on the main frame or base 24 of the roll forging machine. The base 24 supports substantially all of the operating mechanism to be hereinafter described.

The die rolls 7 and 21 may have any suitable designs, patterns, grooves, protuberances or the like formed in their peripheries, depending upon the nature of the work which is being rolled, the action of the first set of die rolls being such as to cause the blank which is being rolled therebetween to approach somewhat the form ultimately desired. Each succeeding set of die rolls will then cause the blank to approach more closely the ultimate shape desired and attained by the last set.

Moreover, alternate sets of rolls are preferably arranged in a plane at right angles to the plane of the other sets of rolls, although the right angle arrangement is not an absolute requisite of the invention, each set of rolls being, if desired, arranged in a plane angularly related to the plane of the preceding set of rolls, such angular relation being other than a right angle. This arrangement of the sets of die rolls enables the following advantages to be secured in the die rolling of articles from blanks: (1) The metal of the blank is displaced in two planes, enabling articles to be manufactured having protuberances extending from the article in two planes. This is especially desirable for the making of articles such as steering knuckles, steering knuckle support arms, connecting rods, steering knuckle arms and pitman arms. (2) Heavier draws can be taken, since an extremely heavy draw taken in one set of rolls, and which might result in undue strain on the blanks, can be rectified by the draw in a different direction on the same portion of the blank in the succeeding set of rolls. (3) The formation of flash is precluded, that is to say, if the draw in one set of rolls is so heavy as to result in an incipient flash at the drawn portion of the blank, the next set of rolls, operating as it does on such incipient flash, destroys it. (4) The use of expensive blank indexing or rotating equipment between sets of rolls is rendered unnecessary.

Figures 5, 9, 10:
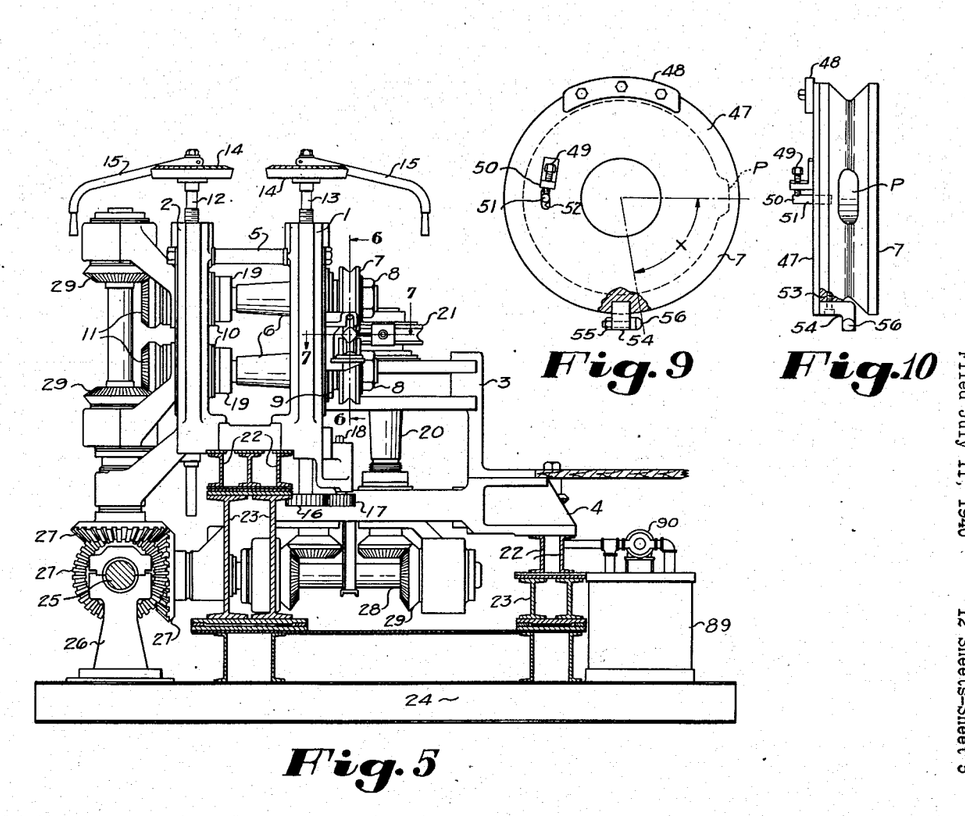
Fig. 9 is a side elevation of one of the die rolls, with a portion broken away to show the blank stop.
Fig. 10 is an end elevation of the die roll shown in Fig. 9.
Figure 8:
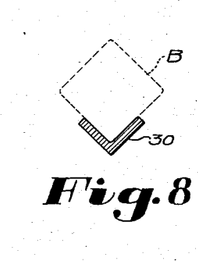
Fig. 8 is a fragmentary cross-sectional view, taken on the line 8—8 of Fig. 6.

By way of example, a die roll is shown in Figs. 9 and 10, such die roll having a V-shaped groove in its periphery for the reception of a blank of square cross-section, as indicated by the dotted lines in Fig. 8, such groove having a protuberance P extending from the walls of the groove and for a portion of the length of the groove, such protuberance being designed to form a corresponding recess in the blank.

The rolls of all the mill stands are driven at a uniform speed by means of driving mechanism comprising a motor driven main drive shaft 25, journalled in bearing brackets 26, and extending substantially the entire length of the mill, mitre gears 27, mill shafts 28 and bevel gears 29, the latter meshing with the pinions on the shafts 6 and 20.

Since the present mill is so designed that the blank must be completely out of one set of rolls before being acted upon by the next set of rolls, it is imperative that means be provided for positively and automatically transferring the blank from each set of rolls to the next in such manner that the blank will enter the next set of rolls in exact registration with the impressions or protuberances in said next set of rolls, that is to say, in such a manner that the entering end of the blank has a fixed registering relation to a predetermined point in the peripheral impression or on the peripheral protuberance of the rolls about to be entered.

Such means, together with certain control mechanism associated therewith, constitute important features of the invention, and will now be described in detail, reference being had more particularly to Figs. 3 to 19 inclusive, of the drawings.

Figure 6:
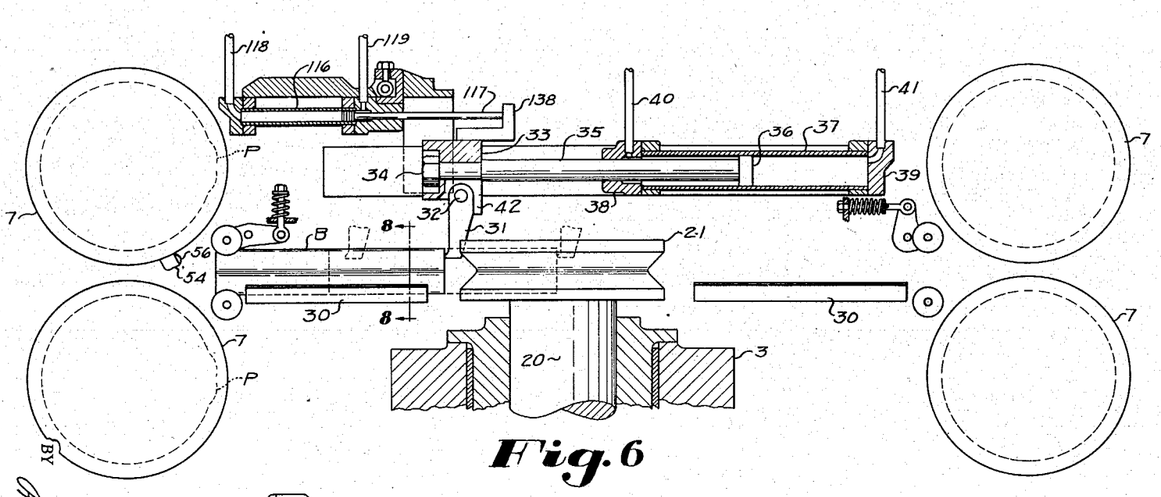
Fig. 6 is a fragmentary cross-sectional view, taken on the line 6—6 of Fig. 5.

Disposed between each set of die rolls is a stationary V-shaped trough or guide 30, which, as shown in Fig. 6, is so disposed that a blank B disposed therein has its axis in alignment with the pass formed by each set of rolls.

When the blank B, in passing through the rolls 21, reaches the dotted line position shown in Fig. 6, that is to say a position in which its rear end is just beyond a line connecting the centers of the rolls 21, it is engaged at the rear by a pusher finger 31. Finger 31 is pivotally connected, as at 32 to a pusher head 33, which is secured, as by a nut 34 to one end of a piston rod or plunger 35, having a piston 36 which operates in a cylinder 37.

The cylinder 37 is stationarily mounted on a suitable base or support, and has secured to its ends heads 38 and 39, having passageways therethrough communicating with the cylinder and with conduits 40 and 41 respectively.

The finger 31 has a limited degree of pivotal movement in the direction of movement of the blank B, but its reverse movement is limited to a position substantially at right angles to the axis of the rod 35, such latter position being determined by a stop 42 on the head 33. After the finger 31 has completed its forward movement, it is returned to its initial position, but in its rearward movement must clear the oncoming blank. It is for the purpose of thus clearing the oncoming blank that the finger 31 must be free to pivot forwardly. Upon return of the finger to its rearmost position, it falls by gravity to the vertical position.

Figure 7:
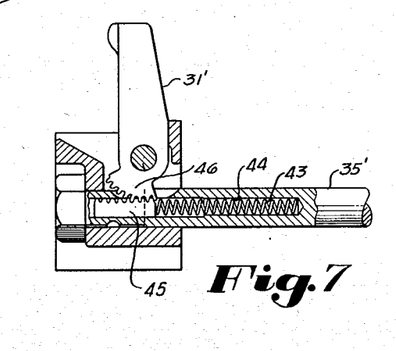
Fig. 7 is a fragmentary cross-sectional view, taken on the line 7—7 of Fig. 5.

The pusher fingers which push the blanks through the horizontal sets of rolls are disposed in a horizontal plane, and gravity cannot therefore be relied upon to return such fingers to a position at right angles to the piston rod. It is necessary in such case to provide means for positively returning the fingers to such position. Such means is shown in Fig. 7, and comprises a compression coil spring 43 disposed within a socket 44 in the end of the rod 35', and which bears against a rack 45, the teeth of which are in mesh with a gear sector 46 formed integrally with the finger 31'.

Referring to Figs. 9 and 10, it will be seen that the die roll has secured to one of its radial faces a disk 47, which is substantially coextensive in area with said face, and which is adjustable to a limited extent circumferentially with respect to the die roll, so as to adjust the position of a cam 48, mounted on the disk adjacent its periphery, relatively to the protuberance P on the roll. This adjustment is effected by means of a screw 49, which is carried by a bracket 50 on the disk 47 and which bears against a pin 51 extending from the die roll through an arcuate slot 52 in the disk concentric with the axis of the disk. By turning the screw 49, the disk may be moved circumferentially with respect to the die roll.

One of the die rolls in each set of rolls, has secured thereto at a predetermined point in its periphery, as by means of a screw 53, an angular bracket 54, to which is secured, as by means of a nut 55, a stop 56, which is adapted to be engaged by the forward end of the blank, so as to insure that the blank will be acted upon by the protuberance P of the die roll at a proper and predetermined point in the length of the blank. In other words, by causing the blank to engage the die roll at a predetermined point in its periphery, as determined by engagement of the blank with the stop 56, entry of the blank into the rolls in proper registration with the die portions of the rolls is insured.

It will be noted that the stop 56 is located at an angle X from the center of the protuberance or die portion P of the die rolls (Fig. 9). As the blank becomes elongated as a result of the rolling operations, this angle X becomes greater with each successive set of rolls.

It is desirable that the blank be pushed into each set of rolls by the pusher finger at a linear speed which is slightly greater than the peripheral speed of the rolls about to be entered by the blank, so as to insure engagement of the front end of the blank with the stop 56 before the blank passes through the rolls. This movement, as previously stated, is effected by means of the piston rod 35, which is hydraulically actuated in a manner to be now described, reference being had more particularly to Fig. 11.

Figure 12:
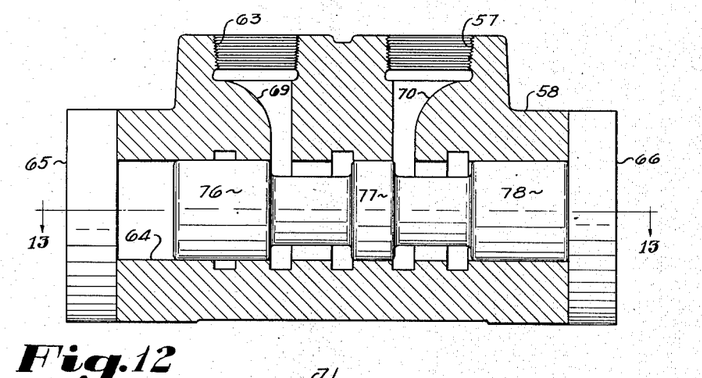
Fig. 12 is a cross-sectional view of the master valve for the blank feeding mechanism, taken on the line 12—12 of Fig. 13.
Figure 13:
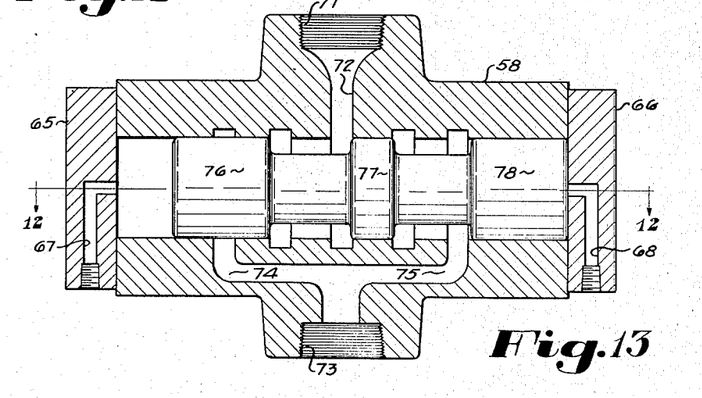
Fig. 13 is a cross-sectional view of the master valve, taken on the line 13—13 of Fig. 12.
Figure 15:
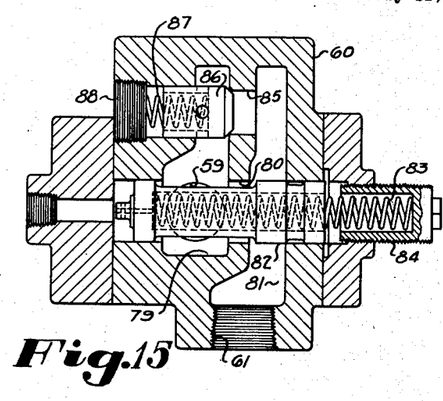
Fig. 15 is a cross-sectional view of a valve which is used in one of the oil connections for the blank feeding plunger.
Figure 16:
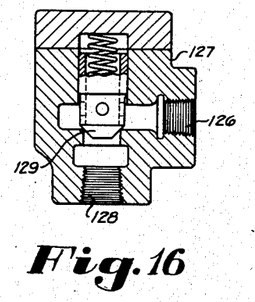
Fig. 16 is a cross-sectional view of a check valve used in connection with one of the solenoid-operated valves.

The conduit 41 communicates, as stated, with the rear of the cylinder 37, and is connected to a port 57 in a master valve 58 (Figs. 12 and 13). The conduit 40 communicates, as stated, with the front of the cylinder 37, and is connected to a port 59 in a valve 60 (Fig. 15). The valve 60 has a port 61, to which is connected a conduit 62, which, in turn, is connected to a port 63 in the valve 58.

The valve 58 has an axial bore 64 therein, closed at its ends by means of end caps 65 and 66 having passageways 67 and 68 respectively therein, which communicate with said bore and serve a purpose to be presently described. Also communicating with the bore 64 by means of passageways 69 and 70 respectively are the ports 63 and 57. The valve 58 also has an oil inlet 71 which communicates with the bore 64 by means of a passageway 72, and an oil drain outlet 73, which communicates with the bore 64 by means of passageways 74 and 75. Mounted in the bore 64 for slidable movement therein is a valve member having three enlarged cylindrical portions 76, 77 and 78 which closely engaged the wall of the bore. The function and operation of the valve 58 will appear hereinafter.

The port 59 in the valve 60 communicates with the port 61 by means of passageways 79, 80 and 81. The passageway 80 is adapted to be closed by means of a valve member 82, which is normally urged into closing position by means of a coil spring 83 interposed between said valve member and a cap 84, which is threadedly secured to the valve 60. Communication between the passageways 79 and 81 is also had through a passageway 85, which is adapted to be closed by means of a valve member 86, which is normally urged to closing position by means of a spring 87 interposed between such member and a plug 88 secured to the valve 60.

Figure 11:
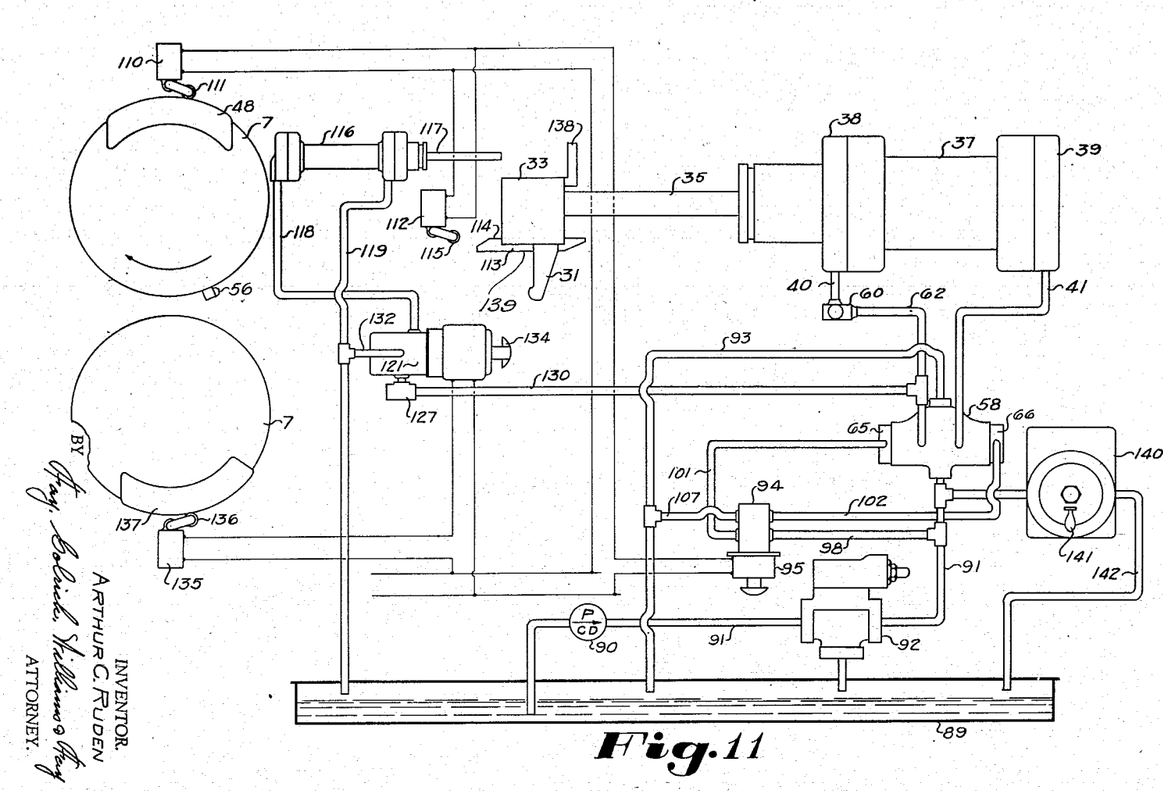
Fig. 11 is a view, illustrating more or less diagrammatically the various controls for the blank feeding mechanisms.

Oil from an oil reservoir 89 is pumped into the port 71 of the valve 58 by means of a continuous discharge pump 90, through a conduit 91, the oil pressure being controlled by means of a pressure regulator 92. Oil is returned to the reservoir from the valve 58 through a conduit 93, which is connected to the port 73 of the valve.

Figure 19:
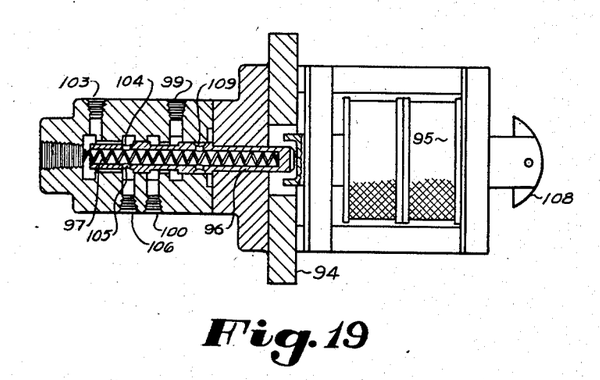
Fig. 19 is a view, partly in section, of the other solenoid-actuated valve.

The flow of oil through the valve 58 is controlled by means of a solenoid valve 94, the detailed construction of which is shown in Fig. 19. Such solenoid valve comprises a solenoid coil 95 and a plunger 96, which is normally maintained in the position which is shown in Fig. 19 by means of a coil spring 97, in which position of the plunger oil will flow from conduit 91 through a conduit 98, through port 99 and 100 of the valve through a conduit 101 and into passageway 67 of the valve 58, thereby causing the valve member 76—77—78 to move to the position shown in Fig. 12 and forcing the oil in the bore 64 between the right end of such valve member and the cap 66 to pass through a conduit 102 through a port 103 in the solenoid valve, through openings 104 and 105 in the plunger 96, out through a port 106 in the solenoid valve, through a conduit 107, drain conduit 93, and into the reservoir 89.

When the solenoid coil 95 is energized, it moves the armature 108 to the left (Fig. 19), thereby moving the plunger 96 to a position in which it closes communication between ports 99 and 100 and between ports 103 and 106. When this occurs, oil will pass from conduit 98 into port 99, thence into an opening 109 in the plunger, through the plunger, out through opening 104, port 103, conduit 102 and into passageway 68, thereby causing the valve member 76—77—78 to move to the left end of the bore 64. This forces the oil in the bore 64 between the left end of such valve member and the cap 65 to pass through and conduit 101 into port 100, out of port 106, through conduit 107, into drain conduit and into the reservoir 89.

The solenoid valve is controlled by a limit switch 110, which is open except at such times, when the cam 48 on the roll 7 (or 21) engages a roller 111 which actuates the limit switch. When the limit switch is thus closed by the cam 48, the solenoid coil is energized with the result, as already described, that oil will pass from the reservoir 89 into the bore 64 and force the valve member 76—77—78 to the extreme left end of the bore. This permits oil to flow from conduit 91 into port 71 of the valve 58, thence through passageway 72, bore 64, passageway 70, port 57, conduit 41, head 39, and right end of the cylinder 37. This causes the piston 35 to move to the left, as viewed in Fig. 6, and pushing the blank B to move toward the rolls 7.

During the course of this movement, the upper die roll 7 has rotated to such a position that the cam leaves the roller 111, so that the switch 110 is opened. Before this occurs, however, and in order to maintain the solenoid 94 energized, a second normally open limit switch 112 is actuated to closed position by means of a cam 113, which is carried by the head 33. This cam has a track 114, which, during the forward movement of the head 33, engages a roller 115 which actuates the limit switch, and in this way maintains the solenoid 94 in energized condition.

The movement of the die rolls and the blank B should be so synchronized as to bring the stop 56 on the upper roll to a predetermined position in advance of the forward end of the blank, just prior to the entry of the blank into the rolls. If the exact length of the blank after discharge from a set of rolls were known, it would be a relatively simple matter to secure the aforesaid synchronized movement. In beginning a series of die rolling operations on a blank, however, it is not always possible to determine what the precise length of the blank will be as it emerges from each set of rolls, and certain factors, such as differences in temperature of the blank as well as variations in the hardness and other properties of the metal will result in variations in such lengths. In other words, if a blank became elongated to an extent beyond what would be normally expected, it would be possible for the front end of the blank to reach a position in which the stop 56 on the upper roll could not pass the upper left-hand corner of the blank without striking the blank, and thereby serious damage might occur to both the blank and stop, and the blank would not enter the rolls properly.

Means have accordingly been provided for forestalling such a possibility, that is to say, means have been provided for preventing movement of the blank until the stop 56 has passed the upper left-hand corner of the blank and moved to a predetermined position in advance of the front end of the blank.

Such means comprises a stationarily mounted cylinder 116 in which a plunger 117 operates, such plunger being actuated by oil (supplied to the left end of the cylinder by means of a conduit 118).

The conduit 118 is connected to a port 120 in a solenoid actuated valve 121, having a bore 122 therein in which a plunger 123 is slidably mounted. This plunger is normally maintained in the position shown in Fig. 18 by means of a coil spring 124, and in this position of the plunger, communication is established between the port 120 and a port 125 of the valve. The port 125 communicates with a port 126 of a check valve 127, such check valve being further provided with a port 128, communication between which and the port 126 is normally closed by means of a spring-pressed valve member 129.

The port 128 communicates with the conduit 62 by means of a conduit 130.

The solenoid valve 121 is further provided with a port 131, to which is connected a conduit 132, which communicates with a drain conduit 119, connected to the right end of the cylinder 116.

Figure 17:
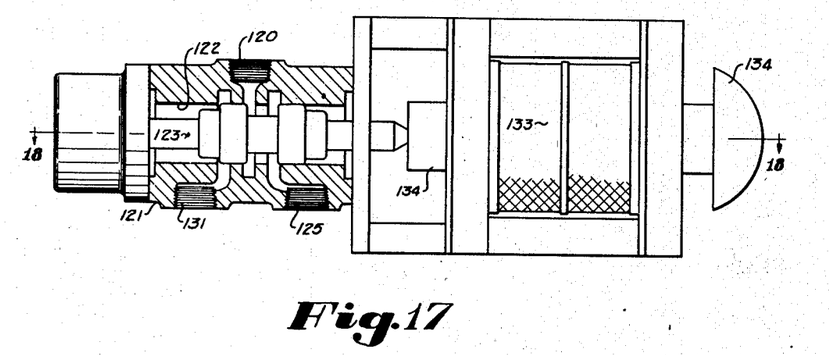
Fig. 17 is a view, partly in section, of one of the solenoid-actuated valves.
Figure 18:
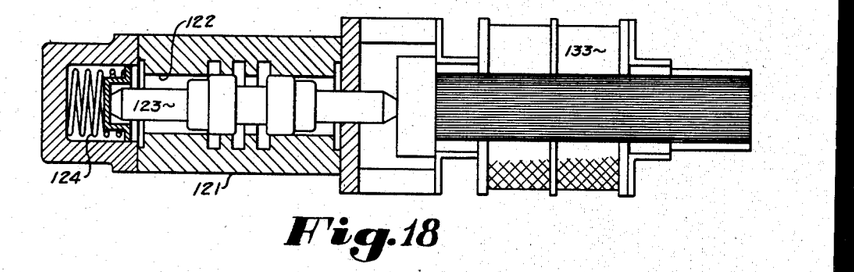
Fig. 18 is a cross-sectional view, taken on the line 18—18 of Fig. 17.

The plunger 123 is adapted to be actuated by means of a solenoid coil 133 which, when energized, moves the armature 134 to the left, as viewed in Figs. 17 and 18, thereby moving the plunger 123 to its extreme left position against the action of the spring 124.

The coil 133 is adapted to be energized by means of a limit switch 135, which limit switch is normally open, but is closed at such times as the roller 136 thereof is engaged by a cam 137 on the lower roller 7. This cam is so disposed with relation to the stop 56 on the upper roll that it will not engage the roller 136 of the limit switch 135 until the stop has moved to a predetermined position in advance of the blank which is about to enter the rolls.

The head 33 has rigidly secured thereto a stop member 138, which is adapted to engage the rear end of the plunger 117.

As long as the roller 136 of the limit switch 135 is not engaged by the cam 137, oil from the conduit 62 will pass through conduit 130, thence through the check valve 127, the valve member 129 of which is opened by the oil pressure, ports 125 and 120, conduit 118, and into the left end of cylinder 116 (Fig. 6), thereby holding the plunger 117 in its extreme rear position as shown in Fig. 6.

In the meantime, the billet is being pushed toward the rolls, and if cam 137 has not yet engaged the roller 136 of the limit switch 135, which is tantamount to saying that the stop 56 is not in the proper position, the stop 138 comes into engagement with the plunger 117, thereby causing the blank to stop, due to the check valve 127 preventing the oil in cylinder 116 from escaping through conduit 118.

As soon as the cam 137 engages the roller 136, however, the limit switch 135 is closed, thereby energizing the solenoid coil 133, and moving the plunger 123 to the extreme left, as viewed in Figs. 17 and 18.

This shuts off communication between the ports 125 and 120 of the valve 121, and opens communication between the ports 120 and 131. Due to the greater cross-sectional area of the cylinder 37 than the cylinder 116, the oil pressure in the former will overcome that in the latter cylinder, with the result that the stop 138 will push the plunger 117 forwardly and force the oil out of the cylinder 116, permitting the blank to resume its movement toward the rolls. The oil, thus discharged from the cylinder 116 will pass through conduit 118, ports 120 and 131 of the valve 121, through conduit 132 and into conduit 119, from which it will be returned to the reservoir 89.

The blank B moves forwardly until it engages the stop 56 and has moved into the rolls far enough to insure that the rolls will take a firm bite on the blank and move it through the rolls without further assistance from the blank pushing mechanism.

At this time, the roller 115 of the limit switch 112 has reached the rear end of the track 114 of the cam 113, and drops, thereby opening the limit switch.

This causes the plunger 96 of the solenoid valve 94 to return to the position shown in Fig. 19, in which position of the plunger, oil will flow from conduit 98 through ports 99 and 100, conduit 101 and into passageway 67 of the master valve 58, thereby moving the valve member 76–77–78 to the position shown in Figs. 12 and 13. In this position of the valve member, oil will flow from conduit 91, through port 71, passageway 72, bore 64, passageway 69, port 63, conduit 62, valve 60, conduit 40 and into the left end of the cylinder 37.

This causes the plunger 35 to return to its rearward position, and during such return movement, the limit switch 112 is maintained in its open condition by virtue of the engagement of a track 139 at the lower edge of the cam 113 with the cam roller 115 of the limit switch.

During the rearward movement of the blank pushing mechanism, the cam 137 leaves the roller 136 of the limit switch, thereby opening such switch and returning the plunger 123 to its normal position, and permitting the plunger 117 to return to the position shown in Fig. 6.

It will be understood that feeding mechanism of the character described is disposed in advance of each set of die rolls, but that the blank must be placed on a trough 30 in advance of the first set of die rolls, and in a position to be moved to such rolls by means of a pusher finger 31.

Figure 14:
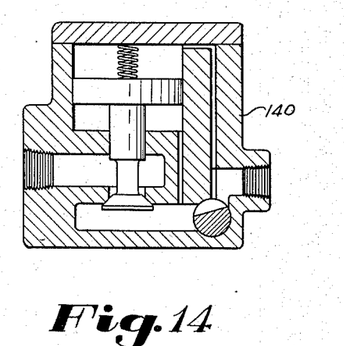
Fig. 14 is a cross-sectional view of the feed control for the master valve.

Reference numeral 140 designates a flow control, the detailed construction of which is shown in Fig. 14, and which serves to regulate the flow of oil to the master valve 58. This is accomplished by setting the handle 141 of the flow control to bleed a predetermined quantity of the oil from the conduit 91 back to the reservoir through a conduit 142.

Having thus described in some detail the principal features and construction of the apparatus, the operation will be briefly described, as applicable, for example, to the rolling of a pair of connected steering knuckles for an automobile or the like.

Figure 20:
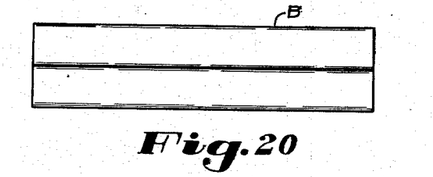
Fig. 20 is a side elevation of a blank used for forming a pair of connected steering knuckles.
Figure 21:
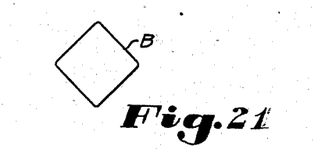
Fig. 21 is an end view of the blank shown in Fig. 20.

The hot blank or billet B, as shown in Figs. 20 and 21, of a size and shape suitable for the production of a pair of connected steering knuckles, is deposited, as by means of a conveyor or tongs, on a trough 30, such as shown in Fig. 8, at a point in advance of pusher finger 31', just before the latter begins its movement toward the first set of rolls, which, in this case are horizontal rolls 21.

The blank is then automatically conveyed to and into the first set of the rolls in a manner which will be evident from the foregoing detailed description of the feeding mechanism, a second blank being placed on the trough 30 as soon as the first blank has passed through the first set of rolls.

Figure 22:
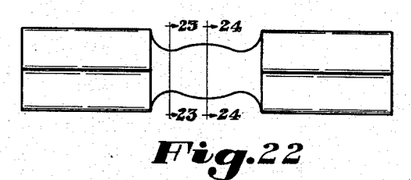
Fig. 22 is a view showing the blank of Fig. 20, after being rolled in the first set of rolls.
Figure 23:
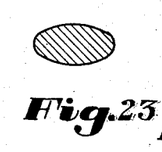
Figs. 23 and 24 are cross-sectional views, taken on the lines 23—23 and 24—24, respectively, of Fig. 22.
Figure 24:
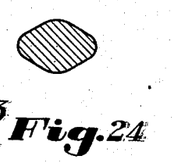
Figure 25:
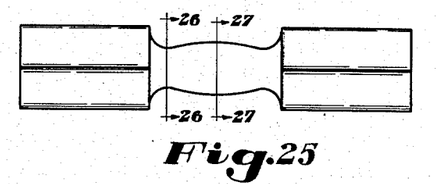
Fig. 25 is a view showing the preliminary shaped blank of Fig. 22, after being rolled in the second set of rolls.
Figure 26:
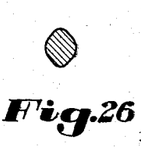
Figs. 26 and 27 are cross-sectional views, taken on the lines 26—26 and 27—27, respectively, of Fig. 25.
Figure 27:
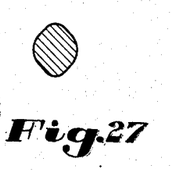
Figure 28:
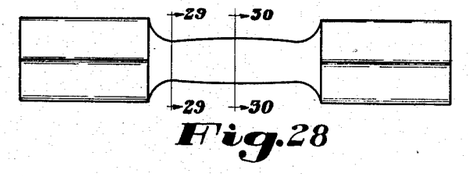
Fig. 28 is a view showing the article of Fig. 25, after being rolled in the third set of rolls.
Figure 29:
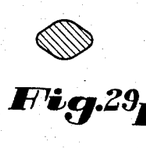
Figs. 29 and 30 are cross-sectional views taken on the lines 29—29 and 30—30, respectively, of Fig. 28.
Figure 30:
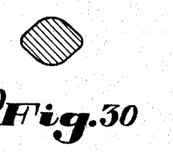
Figure 31:
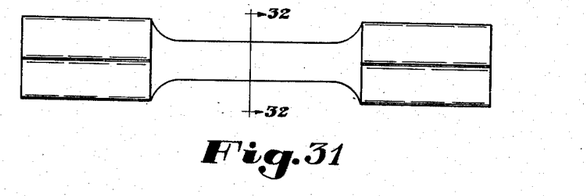
Fig. 31 is a view showing the article of Fig. 28, after being rolled in the fourth set of rolls.
Figure 32:
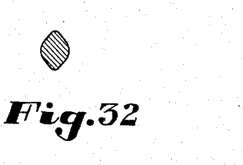
Fig. 32 is a cross-sectional view, taken on the line 32—32 of Fig. 31.
Figures 33, 34, 35:
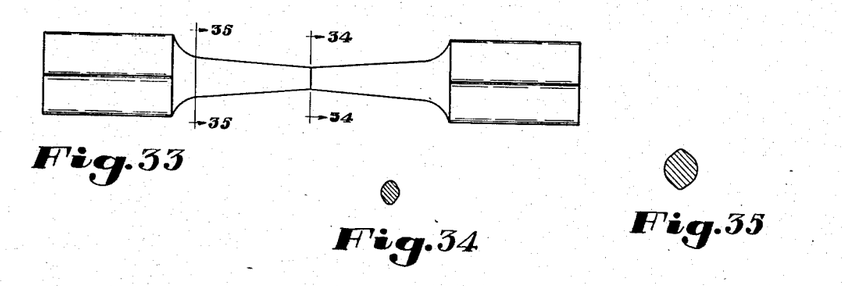
Fig. 33 is a view showing the article of Fig. 31, after being rolled in the fifth set of rolls.
Figs. 34 and 35 are cross-sectional views, taken on the lines 34—34 and 35—35, respectively, of Fig. 33.

In such first set of rolls, the blank has imparted thereto by the rolls the shape which is illustrated in Figs. 22, 23 and 24.

Figure 36:
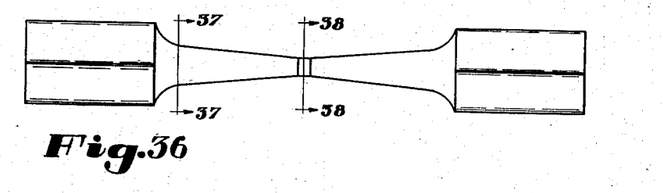
Fig. 36 is a view showing the article of Fig. 33, after being rolled in the sixth set of rolls.
Figure 37:
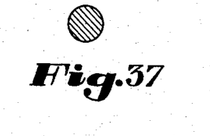
Figs. 37 and 38 are cross-sectional views taken on the lines 37—37 and 38—38 respectively, of Fig. 36.
Figure 38:
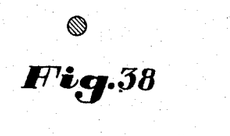

As the blank passes through the succeeding sets of rolls, it has imparted thereto the successive shapes illustrated in Figs. 25, 28, 31 and 33, emerging from the last set of die rolls in the form of a pair of connected steering knuckles, as shown in Fig. 36, which may be severed at the center to provide individual knuckles.

The finished or substantially finished forging, in this case a pair of connected steering knuckles, is discharged by the last set of rolls onto a gravity discharge table, from which it is discharged onto a conveyor to be carried by the latter to any desired point for any further treatment required.

Figure 39:
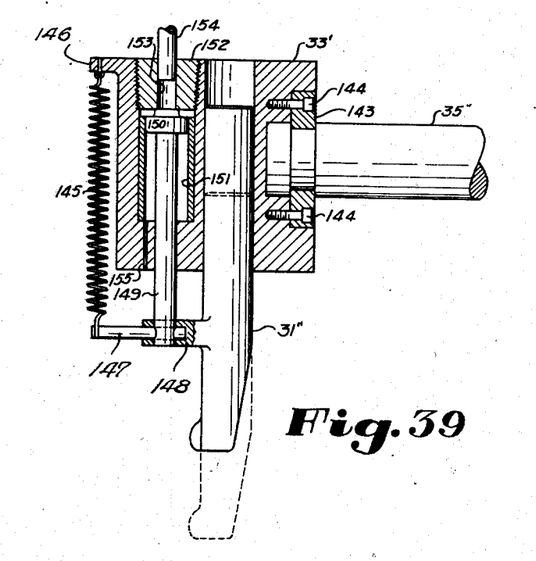
Fig. 39 is a view similar to Fig. 7, but showing a modified form of the blank pushing mechanism.

In Fig. 39 I have illustrated a modified form of the blank pushing mechanism which is desirable for use in cases where the spaces between the sets of die rolls is not sufficient to permit the use of a pivotally-mounted pushed finger.

In this modification, the plunger 35" has secured to its forward end, as by means of a plate 143 and screws 144, a head 33', in which is slidably mounted for reciprocable movement in a vertical plane, a pusher finger 31", which, when in the dotted line position, is adapted to push a blank into a set of rolls, and when in the solid line position, can move rearwardly clear of the oncoming blank.

The finger 31" is normally maintained in its retracted or solid line position by means of a tension coil spring 145, which is connected at one end to a lug 146 which extends from the head 33', and is connected at its other end to a pin 147 which extends from a lug 148 formed integrally with the finger 31".

Movement of the finger 31" to its extended or dotted line position is effected hydraulically against the tension of the spring 145, and for this purpose, a plunger 149 is provided having a piston 150 which works in a cylinder 151, such cylinder being closed at one end by means of a plug 152 having a passageway 153 therein through which oil is adapted to be supplied to the cylinder 151 by means of a conduit 154. The conduit 154 is adapted to be connected to the conduit 102 (Fig. 11), so that when oil is supplied to the conduit 102 for actuation of the plunger 76–77–78, oil will at the same time be supplied to the conduit 154 to actuate the finger 31" to its extended or operative position.

Since oil will not flow into the right end of the cylinder 37 until the plunger 76–77–78 has been moved to its extreme left, it follows that the finger 31" will be moved to its operative position before the plunger 35" has begun its forward movement. The finger 31" will remain in this position until such time that the plunger 35" starts to return to its initial position. At this time, the oil pressure on the piston 150 is relieved, and the spring 145 returns the finger 35" to its inoperative or solid line position, so as to clear the next blank. A drainage outlet 155 is provided for clearing the cylinder 151 of any oil which leaks into the cylinder past the piston 150.

It is thus seen that a method and apparatus have been provided, whereby articles, such as axles, shafts, steering knuckles, crankshaft blanks and the like are produced in commercially desirable quantities, and free from flash and other imperfections. Other forms may be employed embodying the features of my invention instead of the one here explained, change being made in the form or construction herein disclosed, provided the elements stated by any one of the following claims or the equivalent of such stated elements be employed, whether produced by my preferred method or by others embodying steps equivalent to those stated in the following claims.

I therefore particularly point out and distinctly claim as my invention:

1. Apparatus for die rolling blanks, comprising spaced sets of die rolls arranged in alignment with each two adjacent sets of rolls spaced a greater distance than the length of the blank discharged from the first of said sets, means responsive to the movement of the rolls about to be entered by the blank for feeding said blank toward said rolls, means for temporarily stopping the movement of the blank feeding means until such time that the entering end of the blank is in a predetermined registering relation with the die portions of the rolls about to be entered by said blank, and means responsive to the movement of one of said rolls for permitting the movement of said blank feeding means to be resumed when said registering relation is established.

2. Apparatus for die rolling blanks, comprising spaced sets of die rolls arranged in alignment with each two adjacent sets of rolls spaced a greater distance than the length of the blank discharged from the first of said sets, and fluid-actuated means responsive to the movement of the rolls about to be entered by the blank for positively feeding said blank into said rolls.

3. Apparatus for die rolling blanks, comprising spaced sets of rolls arranged in alignment, fluid-actuated means for positively feeding the blank into each set of rolls, and fluid-actuated means for delaying the movement of the blank feeding means pending establishment of a predetermined registering relation between the entering end of the blank and the die portions of the rolls about to be entered by the blank.

4. Apparatus for die rolling blanks, comprising spaced sets of die rolls arranged so that the blank must pass completely out of one set of rolls before entering the next set of rolls, one roll of each set having a stop at a point in its periphery at a predetermined distance from the die portion of said roll, and fluid-actuated means responsive to the movement of said roll for feeding a blank into said rolls and against said stop.

5. Apparatus for die rolling blanks, comprising spaced sets of die rolls arranged so that the blank must pass completely out of one set of rolls before entering the next set of rolls, one roll of each set having a stop at a point in its periphery at a predetermined distance from the die portion of said roll, means responsive to the rotation of said roll for feeding a blank between said rolls and against said stop, means for delaying the movement of the blank until said stop has moved to a predetermined position in front of the entering end of said blank, and means responsive to the rotation of the other roll of said set for rendering ineffective said delaying means.

6. In combination with a set of die rolls, fluid-actuated means for feeding a blank into said rolls, and fluid-actuated means for delaying the movement of the blank feeding means pending establishment of a predetermined registering relation between the entering end of said blank and the die portions of said rolls.

7. In combination with a set of die rolls, one of which has a stop at a point in its periphery at a predetermined distance from the die portion of said roll, means responsive to the rotation of said roll for feeding a blank towards said rolls and against said stop, and means for delaying the movement of the blank feeding means until said stop has moved to a predetermined position in front of the entering end of said blank.

8. In combination with a set of die rolls, one of which has a stop at a point in its periphery at a predetermined distance from the die portion of said roll, means responsive to the rotation of said roll for feeding a blank toward said rolls and against said stop, means for delaying the movement of the blank until said stop has moved to a predetermined position in front of the entering end of said blank, and means responsive to the rotation of the other roll of said set for rendering ineffective said delaying means.

9. Apparatus for die rolling blanks, comprising spaced sets of rolls arranged so that the blank must pass completely out of one set of rolls before entering the next set of rolls, stop means associated with each set of rolls and having a predetermined relation to the die portions of said rolls, means for positively feeding the blank toward each set of rolls, means responsive to the position of said stop for controlling said feeding means, and means for adjusting said last mentioned means.

10. A process of die rolling metal blanks between rotating rolls containing forming dies which comprises moving a blank toward said rolls, substantially arresting movement of said blank toward said rolls until the forming dies have reached a predetermined relation to the forward end of the blank, and then moving the blank toward and between the rolls at a lineal speed in excess of the speed of rotation of the rolls.

11. A process for die rolling metal billets between rotating rolls containing forming dies having a stop in advance thereof which comprises propelling a billet along guides extending to said rolls, retarding the advance of the billet until said stop has cleared the end of the billet, thereafter moving the billet at a speed in excess of the speed of the rolls so as to engage the billet against said stop, and maintaining the billet in engagement with the stop until gripped by the forming dies.

12. In a mill for roll forging billets, a pair of forging rolls between which the billets are fed, said rolls containing cooperating forming dies for shaping the billets, billet guides extending to said rolls and a finger reciprocating along said guides and engaging said billets, said finger being rigidly supported during the forward stroke for propelling a billet onto said guides and into said rolls, and being resiliently deflectable on its return stroke for disengaging the next succeeding billet moving forwardly on said guides, and means for driving said finger and rolls in timed relation.

13. In a mill for roll forging billets, successively arranged pairs of forging rolls between which the billets are fed progressively, said rolls containing cooperating forming dies for shaping the billets, billet guides interposed between adjacent roll pairs and means including a power driven reciprocating member passing between the rolls of one pair and engaging the billet for propelling a billet delivered by said rolls along said guides into the succeeding roll pair.

14. In a mill for roll forging billets, a pair of forging rolls between which the billets are fed, means for feeding said billets to said rolls, including means for constantly urging the feeding means in a direction to feed the billets into said rolls, an abutment restraining movement of said feeding means, and fluid means operable to release said abutment to permit the feeding means to continue its movement in the direction of feed.

ARTHUR C. RUDEN.